(12) United States Patent
Jariabka et al.

(10) Patent No.: US 10,870,292 B2
(45) Date of Patent: Dec. 22, 2020

(54) INDEXING A MEDIA FEED SHAFT

(71) Applicant: Hewlett-Packard Development Company, L.P., Houston, TX (US)

(72) Inventors: Keith Jariabka, Vancouver, WA (US); Michael Ewe, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 15/748,841

(22) PCT Filed: Oct. 28, 2015

(86) PCT No.: PCT/US2015/057884
§ 371 (c)(1),
(2) Date: Jan. 30, 2018

(87) PCT Pub. No.: WO2017/074367
PCT Pub. Date: May 4, 2017

(65) Prior Publication Data
US 2018/0236792 A1    Aug. 23, 2018

(51) Int. Cl.
*B41J 29/38*    (2006.01)
*B41J 11/42*    (2006.01)
*G01D 5/34*    (2006.01)

(52) U.S. Cl.
CPC ............... *B41J 11/42* (2013.01); *B41J 29/38* (2013.01); *G01D 5/34* (2013.01)

(58) Field of Classification Search
CPC ... B41J 11/42; B41J 15/02; B65H 2301/4136; B65H 2511/212; B65H 2511/512; B65H 2405/43; G01D 5/34
See application file for complete search history.

(56) References Cited

U.S. PATENT DOCUMENTS

| | | |
|---|---|---|
| 5,598,201 A | 1/1997 | Stodder et al. |
| 6,017,114 A | 1/2000 | Elgee et al. |
| 6,158,344 A | 12/2000 | Walker et al. |
| 6,428,224 B1 | 8/2002 | Askren et al. |
| 7,391,525 B2 | 6/2008 | Chapman et al. |
| 7,494,204 B2 | 2/2009 | Otsuki |
| 2001/0010526 A1 | 8/2001 | Barinaga |
| 2002/0037191 A1 | 3/2002 | Lesniak et al. |
| 2005/0275151 A1 | 12/2005 | Marra, III et al. |
| 2006/0001729 A1 | 1/2006 | Inana |
| 2009/0235832 A1 | 9/2009 | Wursch et al. |
| 2014/0313256 A1 | 10/2014 | Donaldson et al. |

*Primary Examiner* — Matthew G Marini
*Assistant Examiner* — Marissa Ferguson-Samreth
(74) *Attorney, Agent, or Firm* — Nathan Rieth (57) ABSTRACT

In an implementation, an example method of indexing a media feed shaft in a media feed device includes rotating a media feed shaft and transmitting the rotation to an output gear that is remote from the media feed shaft. The method also includes sensing a feature of the rotating output gear and indexing the media feed shaft to the feature.

12 Claims, 6 Drawing Sheets

INDEXING A MEDIA FEED SHAFT

BACKGROUND

Printers, such as inkjet printers, rely on precise media positioning in order to accurately place printing fluid (e.g., ink) on a page and achieve optimal print quality. Scanning-type inkjet printers include a carriage for holding a print cartridge containing printing fluid. The carriage is scanned across the width of the media as print fluid droplets are ejected from the print cartridge onto the media in a precise manner to form a swath of an image. Depending on the print mode, the media can be advanced by different distances between each carriage scan. For example, the media advance distance may be equal to the height of the printed swath so that the bottom of the printed swath aligns accurately with the top of the next-printed swath. However, the media advance distance is often less than the height of the printed swath to enable nozzles to be "shingled" for better print quality. In any case, inaccurate media advances can result in misaligned print swaths that adversely impact overall print quality.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Precise positioning of print media in printing systems such as inkjet printers enables accurate placement of printing fluid (e.g., ink) onto the media, resulting in high quality printed output. However, tolerances and variations in parts and assembly of such systems are often limiting factors for how accurately a piece of print media can be positioned by a media drive system. For example, inaccuracies of a few thousandths of an inch in the manufacture and/or assembly of a media feed roller or media feed shaft can cause media advancement/feeding errors (i.e., linefeed errors) as media passes through the print zone. These inaccuracies can result in the misplacement of printing fluid (e.g., ink) on the media and noticeable print quality issues. While linefeed advance errors can originate at different stages as media is fed through the system, the main media roller and output roller are often associated with inaccurate positioning of the media through the print zone. Ongoing challenges to reduce the size and cost of printing systems puts added pressure on designing out inaccuracies in the manufacture and assembly of these and other system parts. High precision, low cost parts help to optimize the use of space within the system while improving print quality and lowering overall system costs.

Recurring errors related to tolerances and variations in the parts and assembly of a printing system can often be measured and calibrated out of the system. For example, an encoder disk or wheel rotatably coupled to the primary media feed shaft can be used by a control system to track and adjust the rotation of the shaft. As the encoder disk rotates, an encoder sensor can detect fine lines or marks on the disk that a controller uses to generate digital position and motion information. The controller can then associate the position and motion information with measured linefeed errors. Methods for measuring such errors include, for example, using a doppler laser, or measuring a preprinted calibration document using an integrated media edge detection sensor. The cyclic behavior of such errors means that each revolution of the media feed shaft induces the same error as every other revolution. The measured mechanical linefeed error is therefore "keyed" to the rotational position of the media feed shaft. Because the encoded control system knows how the errors are keyed to the shaft, it can compensate for them by adding in the appropriate positioning offset as a function of its indexed rotation. The end result of this calibration is more accurate media positioning and better print quality.

Such calibration offsets work well to reduce known/measured linefeed errors as long as the media feed shaft can be indexed to a known rotational position. However, if the media feed shaft is at the wrong rotational position (i.e., not indexed) when the calibration offsets are applied, additional linefeed errors can be generated that further reduce print quality instead of improving print quality. When the power to a printing system (e.g., an inkjet printer) is turned off, such as when a printer enters a sleep mode or is unplugged to be relocated, the encoder sensor being used to encode and calibrate the media feed shaft (e.g., during fabrication) can no longer provide feedback to the controller. The shaft is therefore in an unknown rotational position each time the power is restored to the printing system. This is because the shaft is able to rotate to an unknown position while the power is off. Reacquiring the true rotational position of the shaft and indexing that position enables appropriate positional application of the calibration offsets as the shaft rotates to feed media through the printing system.

Previous methods for indexing the media feed shaft include adding dedicated sensors to the encoder disk or shaft to detect the rotational period of the drive being calibrated. Sensors used for this type of detection can include, for example, reflective sensors, sensors that detect a magnetic field, or simple switches (mechanical or optical). While such solutions are generally successful, there can be significant additional costs associated with the additional sensors and the extra space involved in housing the sensors.

Accordingly, examples described herein enable a low cost method and a printing device for indexing a media feed shaft for linefeed error compensation. An existing media edge detection sensor in a printing device is adapted as an index sensor to identify a rotating index feature that is keyed to the rotation of the media feed shaft. A transmission is driven off the media feed shaft, and the final "output" gear in the transmission gear train rotates at the same frequency as the media feed shaft. Thus, the output gear rotation matches the rotation of the media feed shaft. The output gear includes an integrated index feature that protrudes outward from the gear and rotates as the gear rotates. The index sensor travels on a print carriage that scans from side to side across the media width. When the print carriage moves fully to one side of its scanning range (e.g., at the right side wall), the index sensor is positioned over the output gear index feature, and it can detect the index feature as the feature rotates on the output gear. In some examples, the index feature protruding from the output gear is made of a light colored (e.g., white) material to reflect light from the index sensor, while other parts of the gear are made of a dark colored (e.g., black) material that does not reflect light from the index sensor. In these examples the index sensor looks for dark to light transitions to detect the index feature.

During operation, when the media feed shaft begins rotating, the index sensor emits light. As the index feature rotates with the output gear underneath the index sensor's optical receiver, the sensor can detect the rotating index feature by the light that reflects off of the feature. A controller uses the index feature detection data from the index sensor to determine the rotational position of the media feed shaft. The controller can index the media feed shaft by comparing its rotational position with keyed calibration data previously saved in memory during manufacture of the printer. This indexing enables the application of appropriate calibration offsets to advancements of the media feed shaft during printing that cancel out previously determined linefeed errors. Identifying an index for the media feed shaft is done each time the encoder system loses power, which occurs whenever the printing device goes into a power save mode or is powered down or unplugged.

In one example, a method of indexing a media feed shaft in a media feed device includes rotating a media feed shaft and transmitting the rotation to an output gear that is remote from the media feed shaft. The method also includes sensing a feature of the rotating output gear and indexing the media feed shaft to the feature.

In another example, a non-transitory machine-readable storage medium stores instructions that when executed by a processor of a media feed device, cause the media feed device to receive a power-up indication, and in response, to move an index sensor to a position that is proximate to an output gear of a transmission which transfers rotation of a media feed shaft to the output gear. The instructions further cause the device to rotate the media feed shaft, detect an index feature on the output gear, and index the media feed shaft to the detected index feature.

In another example, a media feed device includes a media feed shaft to advance media through a print zone. The device also includes a transmission to propagate rotation of the media feed shaft to a remote index feature, and a sensor to detect the remote index feature as it rotates. The device includes a controller for indexing the media feed shaft based on detection of the remote index feature.

Figure 1:
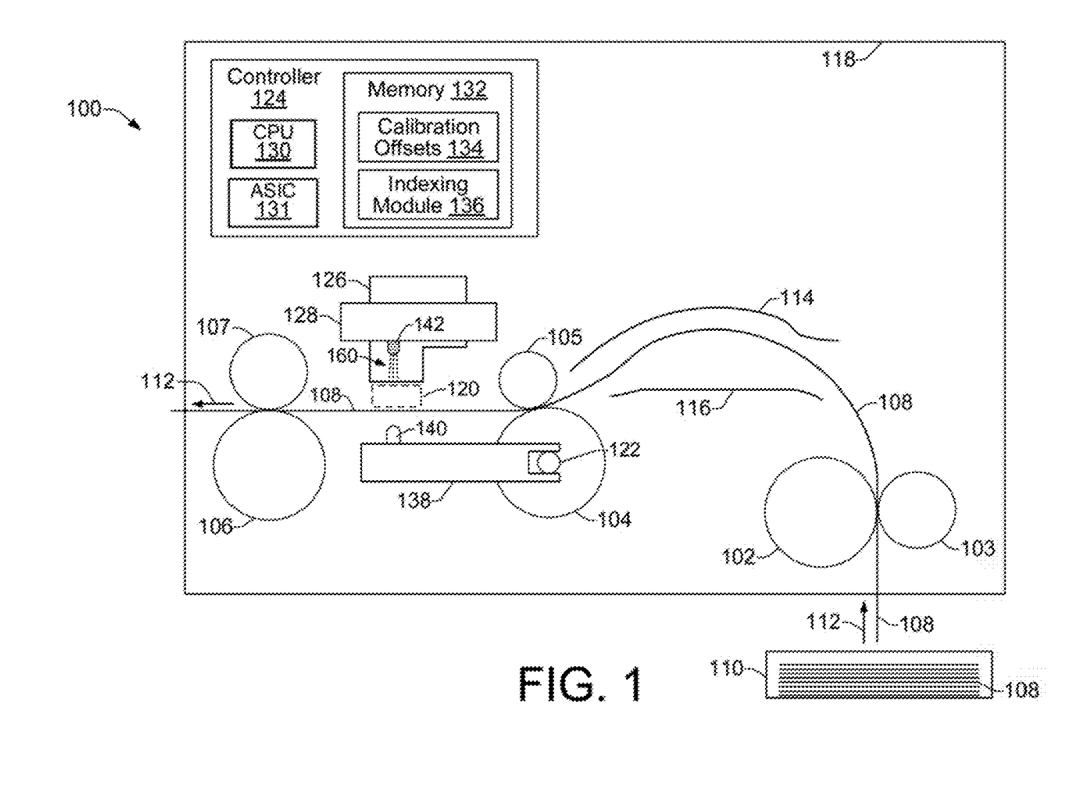
FIG. 1 shows a simplified schematic illustration of an example media feed device suitable for implementing various examples of indexing a media feed shaft.

FIG. 1 shows a simplified schematic illustration of an example media feed device 100 suitable for implementing various examples of indexing a media feed shaft. Examples of a media feed device 100 can include various image forming systems, printing systems, and the like. Thus, while examples herein are described with reference to an inkjet printer 100 (alternately referred to herein as a printer 100, a printing system 100, and so on), such descriptions are equally applicable to a variety of other suitable media feed devices, and image forming and/or printing systems.

As shown in FIG. 1, an example inkjet printer 100 includes a number of media rollers 102, 104, and 106, that operate to transport printable media 108 from a media source 110 through the printer 100 as indicated by the direction arrows 112. Each media roller 102, 104, and 106, operates in conjunction with a corresponding pinch roller 103, 105, and 107, to feed media 108 through the printer 100. The media source 110 can include, for example, a tray to support a number of sheets of media 108, a location for manually feeding media 108 into the printer 100, and so on. Printable media 108 can include any of a variety of suitable sheet material, such as paper, photo paper, card stock, vellum, transparencies, Mylar, polyester, fabric, canvas, and so on.

In some examples, media 108 enters printer 100 by operation of a media roller 102, referred to as a turn roller 102. More specifically, the media 108 is pinched between the turn roller 102 and the corresponding turn pinch roller 103. Rotation of the turn roller 102 causes the media 108 to be fed into the printer 100, where it can pass through upper and lower paper guides 114, and 116, before being engaged by the main roller 104 and main pinch roller 105. In other examples of a printer 100, such as in a printer that receives media through its top side 118, a turn roller 102 may not be present. In such examples, media 108 can enter the printer 100 by rotation of the main roller 104 in conjunction with the main pinch roller 105.

The main roller 104 provides precision control of the media 108 as it rotates to feed the media 108 through a print zone 120. Rotation of the main roller 104 is driven by a media feed shaft 122 whose rotation is accurately controlled by an encoder control system. An encoder control system can include an encoder disk 158 (FIG. 3) rotatably coupled to the media feed shaft 122, an encoder sensor (not shown), and a controller 124. In general, the encoder sensor is to provide feedback to a controller 124 about the disk's rotational position and movement as indicated by the encoder disk 158. The controller 124 can use the encoder sensor feedback to track and adjust the position and/or rotation of the media feed shaft 122 based on calibration offsets 134 previously determined at the time of manufacture. Such calibration offsets 134 can be determined at the time of manufacture and later applied to compensate for (i.e., nullify) measured errors in media advancement, sometimes referred to as linefeed errors. The success of these calibration offsets/adjustments in compensating for the media advance errors depends in part on the media feed shaft 122 being properly indexed, as discussed in more detail herein below.

As the media feed shaft 122 and main roller 104 feed media 108 through the print zone 120, printing fluid can be applied to the media 108 from a print cartridge 126 or a number of print cartridges 126. Reservoirs in a print cartridge 126 can contain different printing fluids such as inks of various colors (e.g., cyan, magenta, yellow, black). A printhead on a print cartridge 126 can eject printing fluid through a plurality of nozzles to deposit the printing fluid onto the media 108. The ejection of printing fluid from a print cartridge 126 can be controlled by controller 124 in communication with a host system (not shown) providing print data to the printer 100. Such data can represent, for example, documents or files to be printed, and the controller 124 can use the data to control patterns of ejected ink drops to form characters, symbols, and/or other graphics or images on the media 108. Print cartridges 126 can be positioned on a moveable carriage 128 that scans across the width of the media 108 in a direction that is perpendicular to the media advance direction indicated by arrows 112. Scanning print cartridges 126 in this manner enables printing fluid to be deposited across the width of the media 108. After the media passes through the print zone 120, the output roller 106 and output pinch roller 107 (sometimes referred to as output starwheel) rotate together to feed the media 108 out of the printer 100.

Controller 124 includes a processor (CPU) 130, machine-readable instructions in firmware and/or software, memory components 132 including volatile and non-volatile memory components, and other printer electronics for communicating with and controlling various components of printer 100, including print cartridges 126, carriage 128, rollers 102-107, media source 110, and other printer functions. In some examples, the controller 124 may include a printer application specific integrated circuit (ASIC) 131 to control components of printer 100. The components of memory 132 comprise non-transitory, machine-readable (e.g., computer-processor-readable) media that provide for the storage of executable coded program instructions, data structures, program instruction modules, job definition format (JDF), and other data for the printer 100, such as calibration offsets 134, and indexing module 136. The program instructions, data structures, and modules stored in memory 132 may be part of an installation package that can be executed by a processor (CPU) 130 to implement various examples, such as examples discussed herein. Thus, memory 132 may be a portable medium such as a compact disc (CD), a digital versatile disc (DVD), or flash drive, or a memory maintained by a server from which the installation package can be downloaded and installed. In another example, the program instructions, data structures, and modules stored in memory 132 may be part of an application or applications already installed, in which case memory 132 may include integrated memory such as a hard drive.

As noted above, a controller 124 can control the deposition of printing fluid onto media 108, as well as track and adjust the media feed shaft 122 with calibration offsets 134 to compensate for media advance errors. In addition, controller 124 can execute instructions from indexing module 136 to index the media feed shaft 122 as discussed in more detail herein below. Indexing the media feed shaft 122 involves transmitting the rotation of the media feed shaft 122 through a transmission 138, and sensing an index feature that rotates via the transmission 138 at the same rate as the media feed shaft 122.

Figure 2:
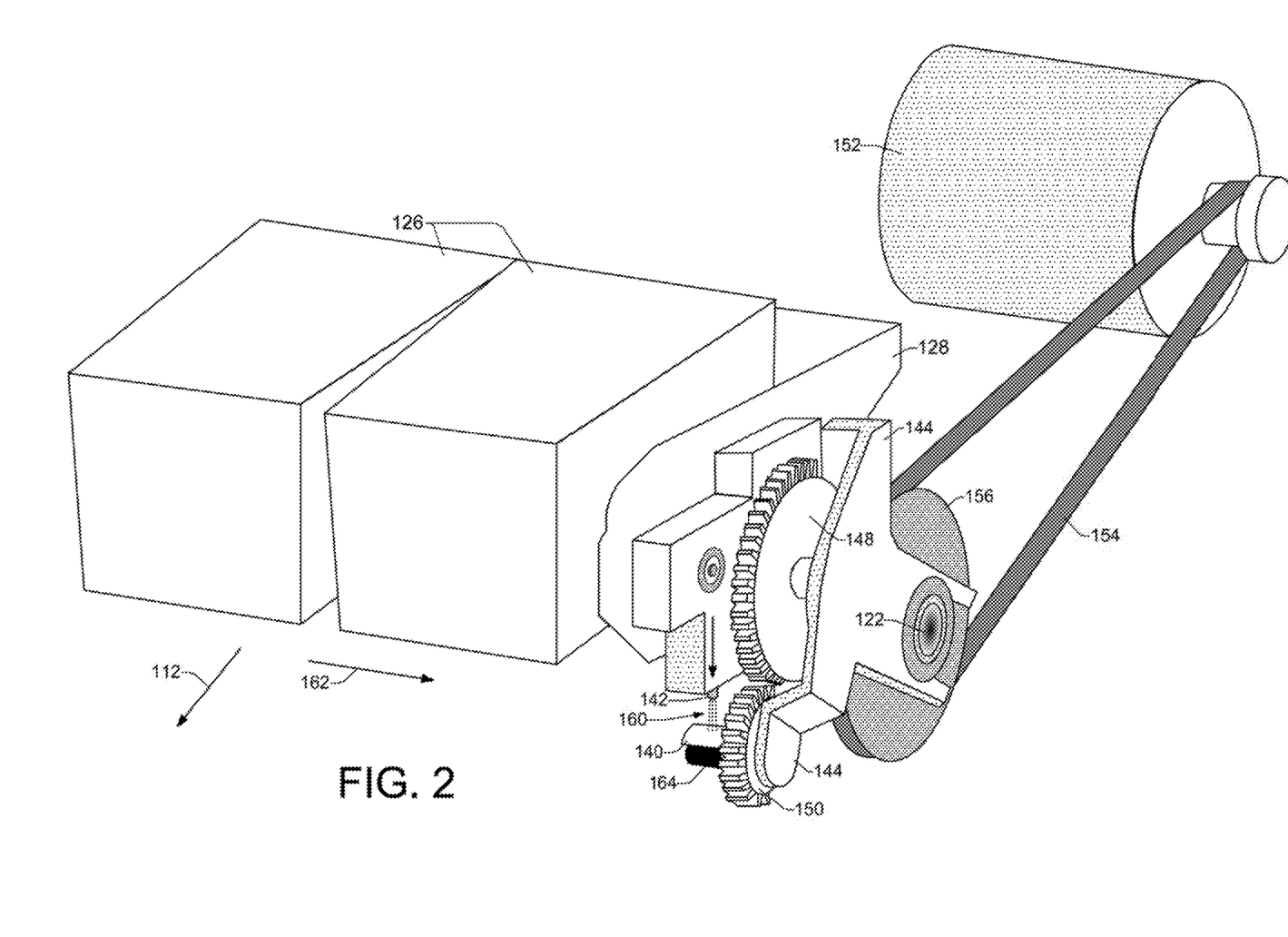
FIG. 2 shows a perspective view of a portion of an example inkjet printer that includes an example transmission, an example index sensor, and an example rotating index feature.
Figure 3:
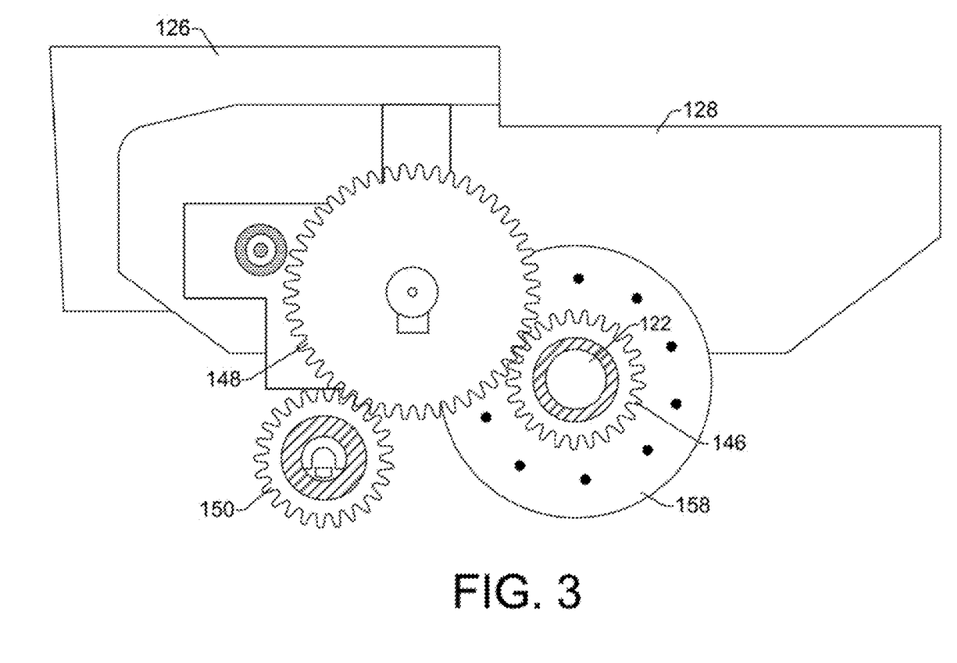
FIG. 3 shows a side view of a portion of an example inkjet printer that includes an illustration of an example media shaft encoder wheel and components of an example transmission.
Figure 4:
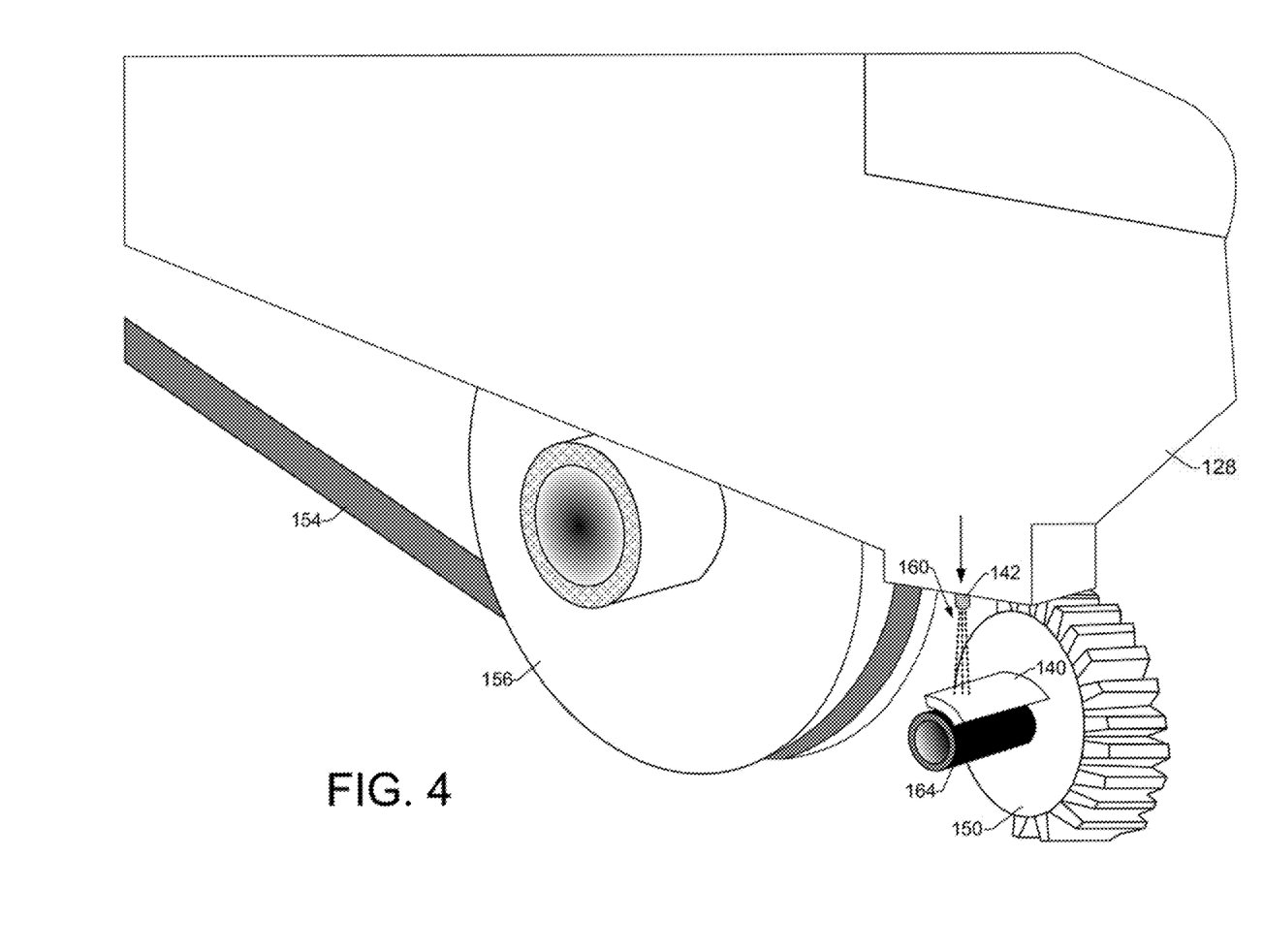
FIG. 4 shows a perspective view of a portion of an example inkjet printer that includes an index feature rotating under an index sensor.

As shown in FIG. 1, the example inkjet printer 100 includes an example transmission 138 that is engaged with the media feed shaft 122. Also shown in FIG. 1 are an index feature 140 rotatable by the media feed shaft 122 through the transmission 138, and an index sensor 142 to sense the feature 140 as it rotates. FIGS. 2, 3, and 4, show different views of various components within an example inkjet printer 100. FIG. 2 shows a perspective view of a portion of an example inkjet printer 100 that includes a more detailed illustration of an example transmission 138, as well as the index sensor 142 and rotating index feature 140. FIG. 3 shows a side view of a portion of an example inkjet printer 100 that includes an illustration of a media shaft encoder wheel and components of the example transmission 138. FIG. 4 shows another perspective view of a portion of the example inkjet printer 100 that includes an illustration of the index feature 140 rotating under the index sensor 142.

Referring generally to FIGS. 1-4, an example transmission 138 can include a transmission bracket 144 that rotatably supports a number of transmission gears. The transmission gears include a drive gear 146 that is rotatably coupled to the media feed shaft 122, an idler gear 148 in rotatable contact through gear teeth with the drive gear 146, and an output gear 150 in rotatable contact through gear teeth with the idler gear 148. The idler gear 148 transmits the rotation of the media feed shaft 122 to the output gear 150, which is remote from the media feed shaft 122. That is, the output gear 150 is not directly rotationally coupled to the media shaft 122, but is instead remotely rotationally coupled to the media shaft 122 through the idler gear 148. The drive gear 146 and the output gear 150 are the same size and therefore rotate at the same speed. Rotation of the media feed shaft 122 is driven by a servo motor 152 that pulls a belt 154 to rotate a pulley 156 and the drive gear 146. The pulley 156 and drive gear 146 are rotatably coupled to the media feed shaft 122. The servo motor 152 is controlled by controller 124.

The index sensor 142 comprises a light source (not separately shown), such as an LED (light-emitting diode) to generate and transmit light 160 in the form of a light beam 160, for example, toward index feature 140. The index sensor 142 also comprises a photo-detector (not separately shown), such as a photo-transistor to receive reflected light, such as light 160 reflecting off of the index feature 140. The photo-detector in the index sensor 142 converts detected light into detection data in the form of a current signal, for example, which the index sensor 142 feeds to the controller 124. The controller 124 can then use the detection data to index the media feed shaft 122 to a known rotational position.

When the printer 100 powers up (e.g., after a sleep mode, or after being turned off or unplugged), the index sensor 142 is brought within proximity of the output gear 150 and index feature 140 by the print carriage 128. The print carriage 128 moves in a direction as indicated by direction arrow 162 (FIG. 2), which is perpendicular to the media path indicated by direction arrows 112. This movement positions the carriage 128 and index sensor 142 closest to the transmission 138 at the far edge of the media width (i.e., the edge of roller 104). In most examples, this position is to the far right-hand side in the printer 100 as indicated by the direction arrow 162.

When the index sensor 142 is in position over the index feature 140, the motor 152 rotates the media feed shaft 122, which in turn rotates the index feature 140 via transmission 138. The index feature 140 rotates in concert with the output gear 150 around an axle 164 of the transmission bracket 144. The index feature 140 rotates at the same speed or rotational frequency as the media feed shaft 122, by virtue of transmission 138. When the media feed shaft 122 begins rotating, the index sensor 142 begins emitting light 160. As the output gear 150 rotates, light 160 from the index sensor 142 intersects or contacts the index feature 140 when the index feature 140 rotates into a position that is below the index sensor 142, as shown in FIG. 4. The index feature 140 is a light color, such as white, and it therefore reflects the light 160 back to the photo-detector of the index sensor 142. However, when the index feature 140 is rotated into a position that is not below the index sensor 142, the light 160 intersects the axle 164. The axle 164 is dark in color, such as black, and does not reflect the light 160 back to the index sensor 142. The reflection of light 160 by the index feature enables the index sensor 142 to detect the index feature 140 as the feature rotates into a position below the sensor.

Figure 5:
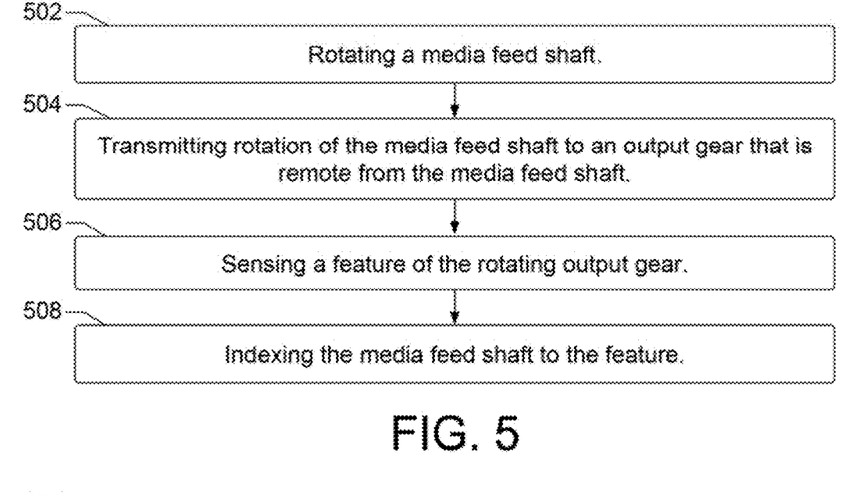
FIG. 5 shows a flow diagram that illustrates an example method of indexing a media feed shaft in a media feed device.
Figure 6:
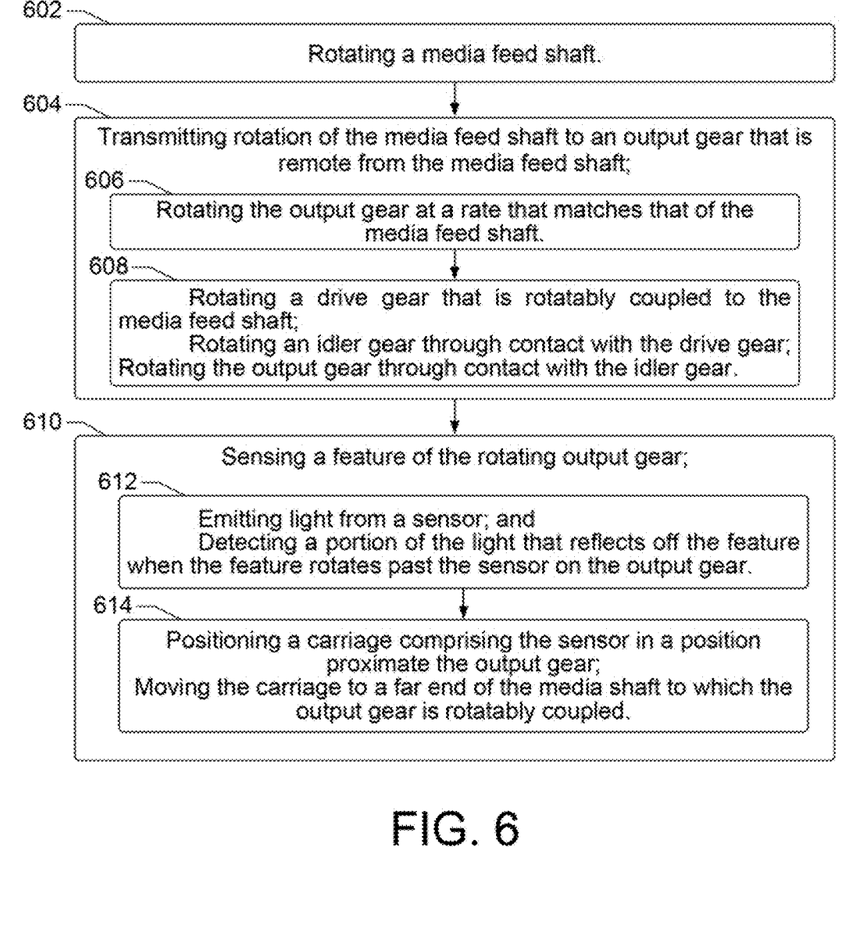
FIG. 6 shows a flow diagram that illustrates another example method of indexing a media feed shaft in a media feed device.
Figure 7:
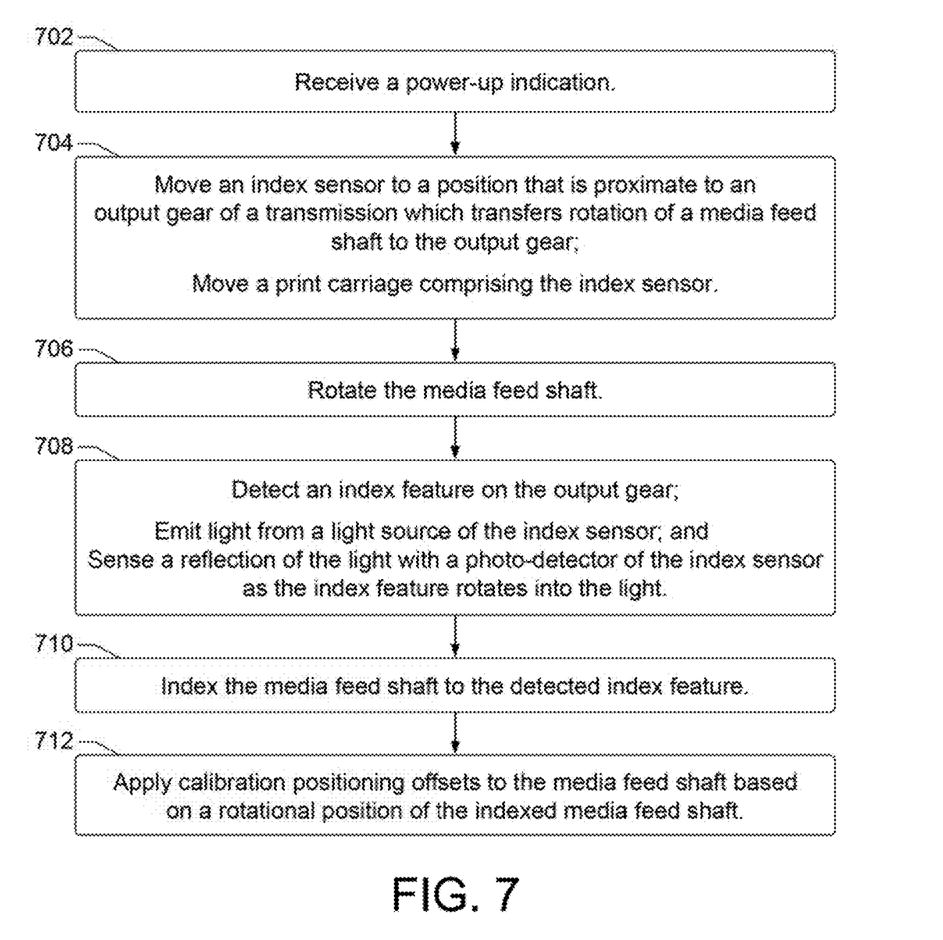
FIG. 7 shows a flow diagram that illustrates another example method of indexing a media feed shaft in a media feed device.

FIGS. 5, 6, and 7, show flow diagrams that illustrate example methods 500, 600, and 700, respectively, of indexing a media feed shaft in a media feed device. The methods 500-700 are associated with examples discussed above with regard to FIGS. 1-4, and details of the operations shown in methods 500-700 can be found in the related discussion of such examples. The operations of methods 500-700 may be embodied as programming instructions stored on a non-transitory, machine-readable (e.g., computer/processor-readable) medium, such as memory 132 shown in FIG. 1. In some examples, implementing the operations of methods 500-700 can be achieved by a processor, such as processor 130 of FIG. 1, by reading and executing the programming instructions stored in a memory 132. In some examples, implementing the operations of methods 500-700 can be achieved using an ASIC 131 as shown in FIG. 1, and/or other hardware components alone or in combination with programming instructions executable by a processor 130.

The methods 500-700 may include more than one implementation, and different implementations of methods 500-700 may not employ every operation presented in the flow diagrams of FIGS. 5-7. Therefore, while the operations of methods 500-700 are presented in a particular order within the flow diagrams, the order of their presentation is not intended to be a limitation as to the order in which the operations may actually be implemented, or as to whether all of the operations may be implemented. For example, one implementation of method 600 might be achieved through the performance of a number of initial operations, without performing some of the subsequent operations, while another implementation of method 600 might be achieved through the performance of all of the operations.

Referring now to the flow diagram of FIG. 5, an example method 500 of indexing a media feed shaft in a media feed device begins at block 502, with rotating a media feed shaft. The method continues at block 504 with transmitting rotation of the media feed shaft to an output gear that is remote from the media feed shaft. As shown at block 506, the method then includes sensing a feature of the rotating output gear. The method continues at block 508 with indexing the media feed shaft to the feature.

Referring now to the flow diagram of FIG. 6, an example method 600 of indexing a media feed shaft in a media feed device is described that provides additional details with regard to the method of FIG. 5. Thus, the method 600 begins at block 602, with rotating a media feed shaft, and continues at block 604 with transmitting rotation of the media feed shaft to an output gear that is remote from the media feed shaft. As shown at block 606, transmitting rotation of the media feed shaft to an output gear that is remote from the media feed shaft can include rotating the output gear at a rate that matches that of the media feed shaft. Transmitting rotation of the media feed shaft to an output gear that is remote from the media feed shaft can also include rotating a drive gear that is rotatably coupled to the media feed shaft, rotating an idler gear through contact with the drive gear, and rotating the output gear through contact with the idler gear, as shown at block 608. The method 600 can continue at block 610 with sensing a feature of the rotating output gear. As shown at block 612, sensing a feature of the rotating output gear can include emitting light from a sensor, and detecting a portion of the light that reflects off the feature when the feature rotates past the sensor on the output gear. As shown at block 614, sensing a feature of the rotating output gear can also include positioning a carriage comprising the sensor in a position that is proximate the output gear. Positioning the carriage in this manner can include moving the carriage to a far end of the media shaft to which the output gear is rotatably coupled.

Referring now to the flow diagram of FIG. 7, another example method 700 of indexing a media feed shaft in a media feed device begins at block 702, with receiving a power-up indication. This can include, for example, a controller of the media feed device receiving an indication that the device is recovering from a sleep mode, or that the device power switch has been turned on or the device has been plugged in. In response to receiving a power-up indication, as shown at block 704, an index sensor can be moved to a position that is proximate to an output gear of a transmission which transfers rotation of a media feed shaft to the output gear. Moving the index sensor can include moving a print carriage comprising the index sensor. As shown at block 706, the method can continue with rotating the media feed shaft. As the media feed shaft rotates, an index feature on the output gear can be detected, as shown at block 708. Detecting the index feature can include emitting light from a light source of the index sensor, and sensing a reflection of the light with a photo-detector of the index sensor as the index feature rotates into the light. The method can then continue at block 710 with indexing the media feed shaft to the detected index feature. As shown at block 712, the method can also include applying calibration positioning offsets to the media feed shaft based on a rotational position of the indexed media feed shaft.

What is claimed is:

1. A method of indexing a media feed shaft in a media feed device, the method comprising:
    rotating a media feed shaft;
    through a transmission, transmitting rotation of the media feed shaft to an output gear that is remote from the media feed shaft, the transmission comprising a drive gear rotatably attached to the media feed shaft, an idler gear, and the output gear, the drive gear to rotate with the media feed shaft and drive rotation of the idler gear, and the idler gear to drive rotation of the output gear;
    sensing a feature of the rotating output gear; and,
    indexing the media feed shaft to the feature.

2. A method as in claim 1, wherein transmitting rotation of the media feed shaft comprises rotating the output gear at a rate that matches that of the media feed shaft.

3. A method as in claim 1, wherein sensing the feature comprises:
    emitting light from a sensor; and
    detecting a portion of the light that reflects off the feature when the feature rotates past the sensor on the output gear.

4. A method as in claim 1, wherein sensing the feature comprises:
    positioning a carriage comprising the sensor in a position proximate the output gear.

5. A method as in claim 1, wherein positioning the carriage comprises moving the carriage to a far end of the media shaft to which the output gear is rotatably coupled.

6. A non-transitory machine-readable storage medium storing instructions that when executed by a processor of a media feed device, cause the media feed device to:
    receive a power-up indication;
    in response to the power-up indication, move an index sensor to a position that is proximate to an output gear of a transmission which transfers rotation of a media feed shaft to the output gear;
    rotate the media feed shaft;
    detect an index feature on the output gear; and
    index the media feed shaft to the detected index feature.

7. A storage medium as in claim 6, wherein detecting an index feature comprises:

emitting light from a light source of the index sensor; and sensing a reflection of the light with a photo-detector of the index sensor as the index feature rotates into the light.

8. A storage medium as in claim 6, wherein moving an index sensor comprises moving a print carriage comprising the index sensor.

9. A storage medium as in claim 6, the instructions further causing the media feed device to apply calibration positioning offsets to the media feed shaft based on a rotational position of the indexed media feed shaft.

10. A media feed device comprising:

a media feed shaft to advance media through a print zone;

a transmission to propagate rotation of the media feed shaft to a remote index feature rotatably attached to an output gear that is remote from the media feed shaft, the transmission comprising a drive gear rotatably attached to the media feed shaft, an idler gear, and the output gear, the drive gear to rotate with the media feed shaft and drive rotation of the idler gear, and the idler gear to drive rotation of the output gear;

a sensor to detect the remote index feature as it rotates; and, a controller to index the media feed shaft based on detection of the index feature.

11. A device as in claim 10, wherein:

the drive gear and output gear are the same size and rotate at a same speed; and the remote index feature is an integral component of the output gear and thereby rotates at the same speed.

12. A device as in claim 10, wherein the remote feature comprises a light color to reflect light from the sensor as it rotates about a dark colored axle that does not reflect light from the sensor.

* * * * *